United States Patent
Akselrod et al.

(10) Patent No.: US 9,788,393 B1
(45) Date of Patent: Oct. 10, 2017

(54) LIGHT ZONES FOR SMART LIGHTING

(71) Applicant: International Business Machines Corporation, Armonk, NY (US)

(72) Inventors: Ben Z. Akselrod, Givat Shmuel (IL); Anthony Di Loreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/073,787

(22) Filed: Mar. 18, 2016

(51) Int. Cl.
*H01K 7/00* (2006.01)
*H05B 37/02* (2006.01)
*B60Q 1/14* (2006.01)

(52) U.S. Cl.
CPC ......... *H05B 37/0218* (2013.01); *B60Q 1/143* (2013.01); *B60Q 2300/30* (2013.01); *B60Q 2900/30* (2013.01); *H05B 37/029* (2013.01); *H05B 37/0254* (2013.01); *H05B 37/0272* (2013.01)

(58) Field of Classification Search
CPC .... B60Q 3/0293; B60Q 11/005; B60Q 1/387; B60Q 1/2603; B60Q 3/048; B60Q 1/44; B60Q 1/143; B60Q 1/1423; B60Q 9/001; B60Q 2300/112
USPC ................ 315/291, 307, 308, 76–78, 80, 82
See application file for complete search history.

(56) References Cited

U.S. PATENT DOCUMENTS

| | | | |
|---|---|---|---|
| 2012/0182425 A1* | 7/2012 | Higgins-Luthman | B60Q 1/085 348/148 |
| 2012/0314434 A1* | 12/2012 | Park | B60Q 1/143 362/465 |
| 2013/0240739 A1* | 9/2013 | Shpater | G08B 29/046 250/353 |
| 2013/0300583 A1* | 11/2013 | Wignot | G01S 13/91 340/907 |
| 2015/0216019 A1 | 7/2015 | Verfuerth | |

OTHER PUBLICATIONS

Nutt et al., "Headlight Intensity Controller Design using Wireless Sensors (HIC-WSN)", Special Issue of International Journal of Computer Applications (0975-8887) on Issues and Challenges in Networking, Intelligence and Computing Technologies—ICNICT 2012, Nov. 2012, 4 pages.

Patil et al., "Design and Implementation of Automatic Street Light Control Using Sensors and Solar Panel", Sharath Patil G.S et al. Int. Journal of Engineering Research and Applications, ISSN : 2248-9622, vol. 5, Issue 6, ( Part-1) Jun. 2015, pp. 97-100.

(Continued)

*Primary Examiner* — Minh D A
(74) *Attorney, Agent, or Firm* — Maeve Carpenter (57) ABSTRACT

A method, executed by a computer, includes receiving extent information for a light zone and a desired emitted light level for a light source proximate to the light zone where the light source is a programmable light source, determining that the light source projects light onto the light zone, and adjusting, by one or more processors, the light source to emit the desired emitted light level. A computer system and a computer program product corresponding to the method area also disclosed herein.

19 Claims, 6 Drawing Sheets

(56) References Cited

OTHER PUBLICATIONS

Robarts, STU, "GM working on car headlights that aim where the driver's looking", gizmag, Mar. 25, 2015, Copyright © Gizmag 2003-2016, 8 pages, <http://www.gizmag.com/vauxhall-opel-eye-tracking-headlights/36710/>.
"NLPIP LightingAnswers", vol. 7 Issue 2, What are lighting environmental zones? Light Pollution, Lighting, Lighting Research Center, © 2003-2007 Rensselaer Polytechnic Institute, Mar. 2003(revised Feb. 2007), 10 pages, <http://www.lrc.rpi.edu/programs/NLPIP/lightinganswers/lightpollution/environmentalZones.asp>.

\* cited by examiner

LIGHT ZONES FOR SMART LIGHTING

BACKGROUND OF THE INVENTION

The present invention relates generally to the field of lighting and more particularly to lighting control.

Light pollution is a side effect of industrial civilization, particularly in urban, densely populated areas. The use of light can be detrimental to astronomical viewing of night skies, energy conservation, and in some areas, to some plant and animal species.

SUMMARY

As disclosed herein, a method, executed by a computer, includes receiving extent information for a light zone and a desired emitted light level for a light source proximate to the light zone where the light source is a programmable light source, determining that the light source projects light onto the light zone, and adjusting, by one or more processors, the light source to emit the desired emitted light level.

DETAILED DESCRIPTION

Embodiments of the present invention recognize that some geographic areas or locations may have specific lighting needs such as an area around an observatory that may require low levels of light or reduced projection of light upwards into the sky.

Embodiments of the present invention provide information that identifies a light zone and communicates a desired level of emitted light for the light zone to a light source. Embodiments of the present invention provide a light source capable of receiving information on a light zone and in response, adjust the light emitted when the light source is within the vicinity of the light zone to attain the desired level of emitted light.

Figure 1:
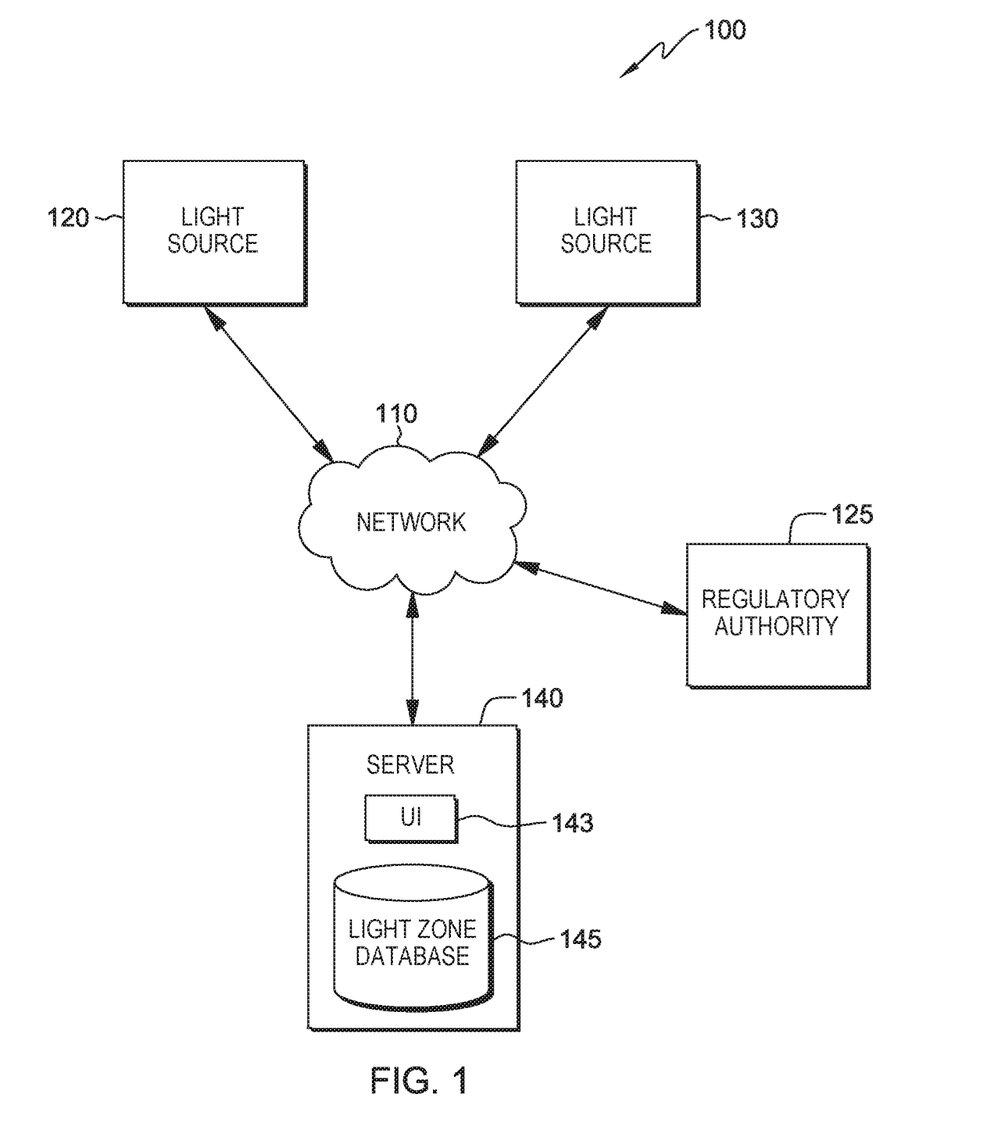
FIG. 1 is a functional block diagram illustrating a distributed data processing environment, in accordance with at least one embodiment of the present invention.

FIG. 1 is a functional block diagram illustrating a distributed data processing environment, generally designated 100, in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, distributed data processing environment 100 includes light zone 120, regulatory authority 125, light source 130, and server 140 all interconnected over network 110. Network 110 can include, for example, a telecommunications network, a local area network (LAN), a virtual LAN (VLAN), a wide area network (WAN), such as the Internet, or a combination of the these, and can include wired or wireless connections. Network 110 can include one or more wired and/or wireless networks that are capable of receiving and transmitting data including receiving global positioning system (GPS) signals, radio waves, map or GPS co-ordinates, geofence data, wireless transmitter location data, voice, and/or video signals, including multimedia signals that include voice, data, and video information. In general, network 110 can be any combination of connections and protocols that will support communications between light zone 120, regulatory authority 125, light source 130, server 140, and other computing devices (not shown) within distributed data processing environment 100.

Light zone 120 is an area with an associated desired emitted light level. Light zone 120 may be a light zone that is stationary (i.e., non-moving) or a moving light zone. For example, a stationary light zone may be an area or a radius around an observatory. A moving light zone, for example, may be a moving area such as an area around a moving actor in a theatrical production. Additionally, light zone 120 may be an active light zone or a passive light zone. An active light zone may emit a signal such as Wi-Fi hot spot, a beacon, or a geofenced area that may send a communication with information (e.g., a desired emitted light level) to light source 130. A passive light zone may be defined by GPS coordinates, map coordinates, or the like, that triggers light source 130 to retrieve stored information on a desired emitted light level corresponding to light source 130's current location (e.g., GPS location). The information on a desired emitted light level may be retrieved from a database (e.g., light zone database 145 on server 140) or from persistent storage 408 in server 140 and/or light source 130.

Extent information for light zone 120 may include information identifying a two dimensional area, or a three dimensional area for light zone 120. Extent information and one or more specified levels of emitted light for light zone 120 may be provided by one or more regulatory authorities 125. For example, a specified emitted light level for light zone 120 may be determined by local, national, state, or providential governments, a community organization such as an owner's association, by an individual such as an artist, a lighting manager in a theatrical production, or other identified individual or governing entity that may determine an extent for light zone 120 and/or a desired emitted light level for light zone 120. Information such as extents, location, and a desired emitted light level for light zone 120 may be communicated via network 110 to light source 130 from server 140, regulatory authorities 125, or light zone 120. In an embodiment, regulatory authority 125 communicates information on light zone 120 such as an extent, a location, and a desired emitted light level to light source 130 from. Light zone 120 may be a stationary area such as a no or low light zone in a theater box seat during an opera or light zone 120 may be a moving light zone 120 such as an area around an actor in a play.

Light zone 120 may have a desired or defined level of emitted light level for a light source proximate to or in the vicinity of light zone 120. A defined level of emitted light may include one or more of the following attributes an intensity, a color, a duration, a period of time, a wavelength, a frequency (e.g., an ON/OFF frequency), and a direction. In various embodiments, light zone 120 corresponds to an area of a low emitted light level such as little to no light emitted into light zone 120. In some embodiments, light zone 120 corresponds to another desired emitted light level such as specified color or a high intensity level of emitted light into light zone 120.

Light source 130 is a light source capable of receiving communications such as signals or data providing information for light zone 120 and capable of providing variable levels of emitted light. Light source 130 may receive or send communications on information corresponding to one or more of a light zone location, a light zone area, a light zone boundary, a desired emitted light level for a light zone, a current light source location, and an emitted light level, or the like. The communications may occur with light zone 120, regulatory authority 125, or server 140 via network 110.

Light source 130 may be a smart light source. A smart light source may be a configurable or a programmable light source that includes more than one of processors, communication devices (e.g., signal receivers and/or signal transmitters), sensors, and one or more sources of emitted light. The sensors may be one or more or light sensors, one or more radio frequency (RF) sensors, IR sensors, electromagnetic wave sensors, or laser sensors. In various embodiments, light source 130 changes a level of emitted light in response to signals or data received by light source 130.

Light source 130 may be any known source of light or a combination of known light sources (e.g., an array of light emitting diodes). For example, a source of emitted light in light source 130 may be a spotlight, a landscape light, a vehicle headlight, a track light, a vehicle headlight light source that may be composed of one or more light emitting diodes (LEDs), or any other known light source. Light source 130 may a moving light source such as a car headlight, an adjustable direction light source such as a spotlight, or a stationary light source such as an exterior light source on a home. Light source 130 may change a level of emitted light or light attributes such as a light intensity, a light color, a light direction, a frequency of ON/OFF cycles (e.g., for flashing or blinking lights), and other another similar light attributes.

Server 140 can be a web server, a management server, a standalone computing device, a desktop computer, a notebook, a tablet, a mobile computing device, a smart phone, a wearable computing device, or any other electronic device or computing system capable of receiving, sending, and processing data. Server 140 can be a web server, a server system, a laptop computer, or any programmable electronic device capable of communicating with light source 130, light zone 120, and other electronic devices in distributed data processing environment 100 via network 110. In various embodiments, server 140 is a shared pool of configurable computing resources (e.g., networks, servers, storage, applications, and services) that act as a single pool of seamless resources when accessed such as used in a cloud-computing environment.

Server 140 may include user interface (UI) 143 and light zone database 145. UI 145 is any known user interface that enables a user of server 140 interact with programs and data in light zone 120 and light source 130, and other computing devices (not shown in FIG. 1). Light zone database 145 may store information on one or more light zones such as information on an extent of a light zone, a desired level of emitted light for a light source, and specifications or documents relating to various light zone requirements. While depicted on server 140, light zone database 145 may reside in one or more other computers (not shown in FIG. 1). Server 140 may send and receive data such information relative to an extent of light zone 120 and a desired level of emitted light for light zone 120 to and from light source 130 via network 110. In various embodiments, server 140 may send and receive location data such as GPS coordinates, geofence data, and RFID data to and from light zone 120 and light source 130 via network 110.

Figure 2:
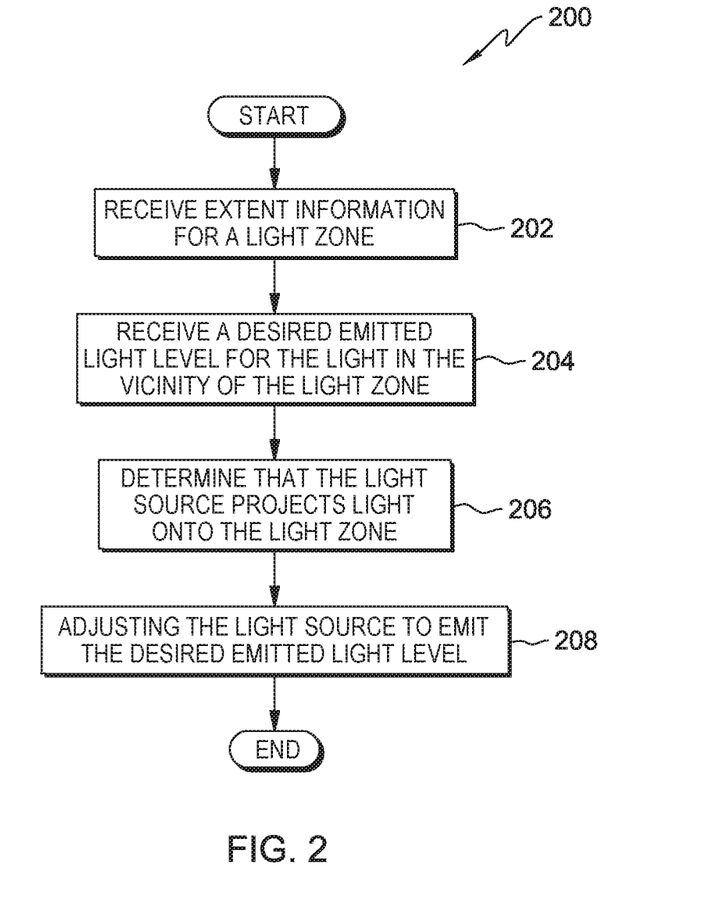
FIG. 2 is a flowchart depicting one example of a light control method for a light source in accordance with at least one embodiment of the present invention.

FIG. 2 is flowchart 200 depicting one example of a light control method 200 for a light source in accordance with at least one embodiment of the present invention. As depicted the light control method 200 includes receiving (202) extent information for light zone 120, receiving (204) a desired emitted light level for light source 130, determining (206) that the light source projects light onto the light zone, and adjusting (208) the light source to emit the desired level emitted light level. Light zone identification method 200 may be conducted by one or more of light zone 120, light source 130, and server 140.

Receiving (202) extent information for light zone 120 may include light source 130 receiving information on an area for light zone 120 from at least one of light zone 120, regulatory authorities 125, and/or server 140. Extent information on light zone 120 may include an area, a volume, and one or more locations. An extent of light zone 120 may be defined or identified by one or more of GPS coordinates, map coordinates, a geofence, one or more wireless signals, infrared (IR) or laser measurements or signals, manual measurements, radio-frequency identification (RFID) system, indoor positioning system (e.g., using radio waves, magnetic fields, or acoustic signals), an optical positioning system, and any other known location determination systems or technologies that may be used to identify a location and define an area for light zone 120. The extent information about light zone 120 may include two dimensions for an area (e.g., a length and a width) for light zone 120 or three dimensions for an area such as a volume (e.g., a length, a width, and a height) for light zone 120. In an embodiment, the information on an extent of light zone 120 changes. For example, light zone 120 may only be in effect from March through October or 10 pm to 6 am in which case, there may not be an extent of light zone 120 during April or at 9 pm respectively (e.g., no light zones in effect at in April or at 9 pm).

The extent information on light zone 120 may be communicated to light source 130 from light zone 120 and/or server 140 using known wireless technologies (e.g., a beacon, Wi-Fi, magnetic, RF or radio wave signals). In some embodiments, server 140 retrieves from light zone database 145 information stored on light zone 120 and communicates to light source 130 information on a location and an extent of light zone 120. In an embodiment, light source 130 retrieves from persistent storage 408 or memory 406 information stored on light zone 120 including data on the extent of light zone 120 and on the desired emitted light level for light zone 120.

Receiving (204) a desired emitted light level for light source 130 includes light source 130 receiving from light zone 120, regulatory authorities 125, server 140, or the like, information on a desired emitted light level. The desired emitted light level may include a light intensity, a direction, a duration, a period of time, a color, or a frequency (e.g., an ON/OFF frequency in blinking lights) for light projected or emitted from light source 130. A light intensity for emitted light may include a luminous intensity, a radiant intensity, luminance, or other photometric or radiometric measure of intensity that may include one or more of a directional or angular component (e.g., in a particular direction or per unit solid angle), an area or spatial component, or a power (e.g., flux or wavelength-weighted power).

A direction for the emitted light may include no or little upward projected light, no or little light projected toward a specified area, or may include directing light or specific level of emitted light (e.g., a minimum or a maximum light intensity) toward a target or an area such as a billboard or an actor moving on a stage. Information received by light source 130 on a duration for an emitted light level may include a duration such as no light projected upward from 6 pm to 6 am. A desired emitted level of light may be for a period of time such as three months for animal migration. In various embodiments, a received desired emitted light level for light zone 120 changes. For example, a desired emitted light level for light zone 120 may change by a schedule (e.g., a level of emitted light less than 3 LUX from 10 pm to 6 am for three specified months and no restriction after the specified months), by a received signal (e.g., a signal identifying a geofenced area), or by a determined location (e.g., by a GPS location) for example.

Determining (206) that light source 130 projects light onto light zone 120 may include determining that light source 130 is in the vicinity or within light zone 120 using one or more of a GPS location, a geofence, a map coordinate location, or other known location determination method. In some embodiments, determining that light source 130 is proximate to light zone 120 occurs using wireless technologies such as IR signals, magnetic fields, acoustic waves, or the like. Information previously communicated in step 202 by one or both of server 140 or light zone 120 may include a specified location of light zone 120 boundary. Light source 130 may determine a current location that may be proximate to a light zone 120 boundary or crossing a light zone 120 boundary using known methods such as GPS, radio frequency identification (RFID), or geo-fencing. Light source 130 may use a processor and received data from light source 130 receivers, sensors and/or controllers to determine an emitted light level projected into light zone 120. The determined emitted light level may be based on a current light source 130 location, a distance to light zone 120, and information on the light generated by light source 130 such as an intensity, a power level, a color, a direction or angle, or any shielding or areas of light source 130 for a reduced level of light projection.

Adjusting (208) light source 130 to emit the desired emitted light level includes one or more of changing an emitted light intensity, changing a light color or a light wavelength, changing an emitted light direction, changing the duration of an emitted light, changing a frequency of activation (e.g., ON/OFF cycles for blinking lights), and adding or removing a partial or full block or shield of the light source, and changing an area of projected or emitted light from light source 130. Changing an area of projected light may occur by blocking some or the entire emitting light surface of light source 130 or by partial illumination of light source 130. For example, light source 130 such as a vehicle headlight may be composed of an array of individual LED elements that emit light. One or more of the array of individual LED elements may not be activated or turned on when the vehicle headlight is partially illuminated. Based on received information on a desired emitted light level for light zone 120 (step 204) and a determination that light source 130 is approaching or crossing a boundary into light zone 120 (step 206), light source 130 automatically adjusts the emitted light to correspond to the received information on the desired emitted light level for light zone 120. Light source 130 (e.g., a smart light source) may upon entering the vicinity of light zone 120 change the emitted light intensity or the emitted light color of projected light from light source 130. Light source 130 may change the emitted light intensity or the emitted light color to match or correspond to the received information on a desired emitted light level such as a desired light intensity level or a desired light color for light zone 120.

Figure 3A:
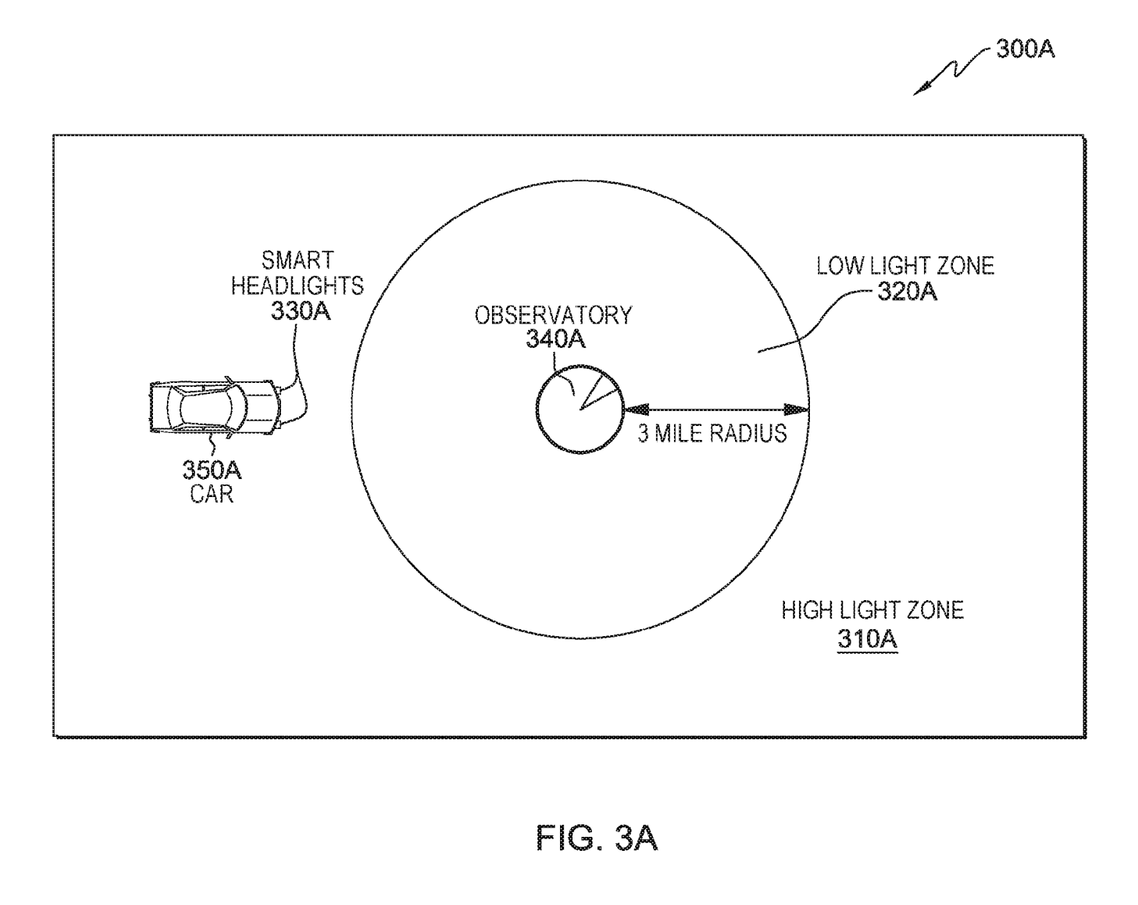
FIG. 3A is an illustration depicting one example of a stationary light zone in accordance with at least one embodiment of the present invention.

FIG. 3A is an illustration 300A depicting one example of stationary light zones in accordance with at least one embodiment of the present invention. As depicted, FIG. 3A includes rural light zone 310A, low light zone 320A, smart headlights 330A, car 340A, and observatory 350A. High light zone 310A and low light zone 320A depict examples of stationary or non-moving light zones and a moving light source (e.g., smart headlights 330A on car 340A).

High light zone 310A is an example of a low population density area or a rural area where a high level of emitted light may occur. High light zone 310A may be an area of high beam headlight operation for vehicles in high light zone 310A. An emitted level of light for high beam operation and low beam operation of automotive headlights for highway use may be specified by a national or an international government agency. An extent or a spatial definition of rural light zone 310A and low light zone 320A may be determined by a governing body such as municipality, a providence, a state, or by an agency (e.g., a department of transportation) and may be documented in a document or manual such as a Manual on Uniform Traffic Control Device (MUTCD) or other similar document. For example, high light zone 310A may be an area or a zone defined based on a low level of population or a limited number of houses in a pre-determined area such as less than 20 residences per square mile. High light zone 310A with a low population density may promote or allow the use of high beams for vehicles when not approaching another vehicle. The municipality may send data such as GPS coordinates and/or map coordinates identifying high light zone 310A and low light zone 320A to smart headlights 330A and/or a server (e.g., to server 140 or to light zone database 145 on server 140 as depicted in FIG. 1). Using the light zone identification method 200 previously discussed, upon entry into rural light zone 310A (e.g., determined by smart headlights 330A and/or car 340A GPS coordinates), smart headlights 330A automatically adjust to a high beam setting.

Low light zone 320A is an example of an area with a low or reduced emitted light level. Low light zone 320A may be defined as an area or a circle determined by a radius or fixed distance (e.g., three miles) around observatory 350A. Low light zone 320A may be identified as an area of a low projected or reduced emitted light area where car headlights are desired to have a low beam setting to minimalize the impact of the emitted light into the sky and thus, improve the ability to view stars in the nighttime sky from observatory 350A. The desired emitted light level for low light zone 320A may have both a reduced intensity for the emitted light level and a directional component such as a lower angle or a lower projection angle (more parallel to a horizontal line along a car's length) as compared to a high beam setting. Both a low beam setting and a high beam setting for automotive vehicles may be defined by industrial or governmental regulations. Car 340A with smart headlights 330A may automatically adjust smart headlights 330A from a high beam setting used in high light zone 310A to a low beam setting upon entering low light zone 320A. For example, smart headlights 330A may receive a signal from a beacon or a geofence triggered communication of the new desired level of emitted light upon entering low light zone 320A and, in response, change to low beam operation.

Figure 3B:
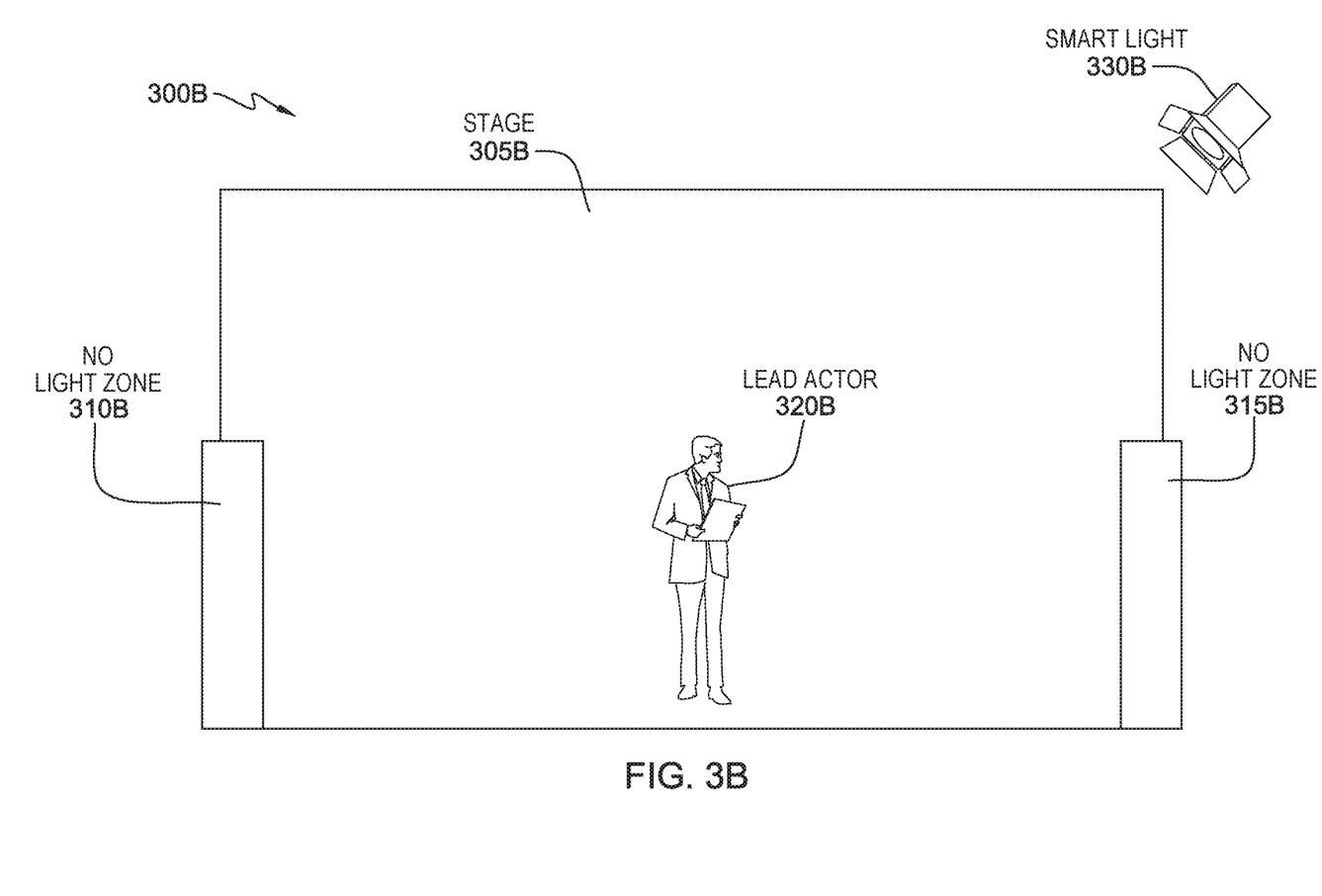
FIG. 3B is an illustration depicting a second example of a light zone in accordance with at least one embodiment of the present invention.

FIG. 3B is an illustration 300B depicting a second example of light zones in accordance with at least one embodiment of the present invention. As depicted, FIG. 3B includes stage 305B, no light zone 310B, no light zone 315B, lead actor 320B, and smart light 330B. Smart light 330B is a stationary or a movable spotlight with an adjustable direction used in a theatrical production with no light zone 310B and 315B.

No light zones 310B and 315B correspond to areas where performers may be waiting to enter the stage or may exit the stage and as such, smart light 330B receives communication, for example, from server 140 on the location and the extent of no light zones 310B and 315B. In response to receiving the information on the location and extent of no light zones 310B and 315B, smart light 330B restricts the projected light by, for example, restricting a range of spotlight (e.g., smart light 330B) motion to prevent directing the emitted light into no light zones 310B and 315B.

In various embodiments, one or more light sources such as smart light 330B track a moving light zone. While not depicted in FIG. 3B, a light zone may be a moving light zone around lead actor 320B that follows lead actor 320B's motion across stage 305B. For example, lead actor 320B may have a RF tag, a smart phone, or another known method of indoor location determination so that a spotlight (e.g., smart light 330B) may determine a location of lead actor 320B and, in this example, a light zone is the area surrounding lead actor 320 (e.g., a five foot radius surrounding lead actor 320B). Using light zone identification method 200, smart light 330B receives a communication such as a wireless signal identifying lead actor 320B's position as a target or a direction for smart light 330B to project the desired emitted light level. In addition, the received communication may include information on a desired minimum or a maximum intensity of the emitted light level and/or a color of the emitted light for smart light 330B.

One or more smart spotlights such as smart light 330B may use the location of lead actor 320B as a target or a direction to project a beam of light at lead actor 320B and/or actors near lead actor 320B. Smart light 330B may track or follow lead actor 320B creating a moving light zone (not depicted in FIG. 3C) using known indoor location methods until server 140, light zone 120 or light zone 130 identifies another actor (not shown) to target, or lead actor 320B enters no light zone 310B or no light zone 315B, or the production ends.

Figure 3C:
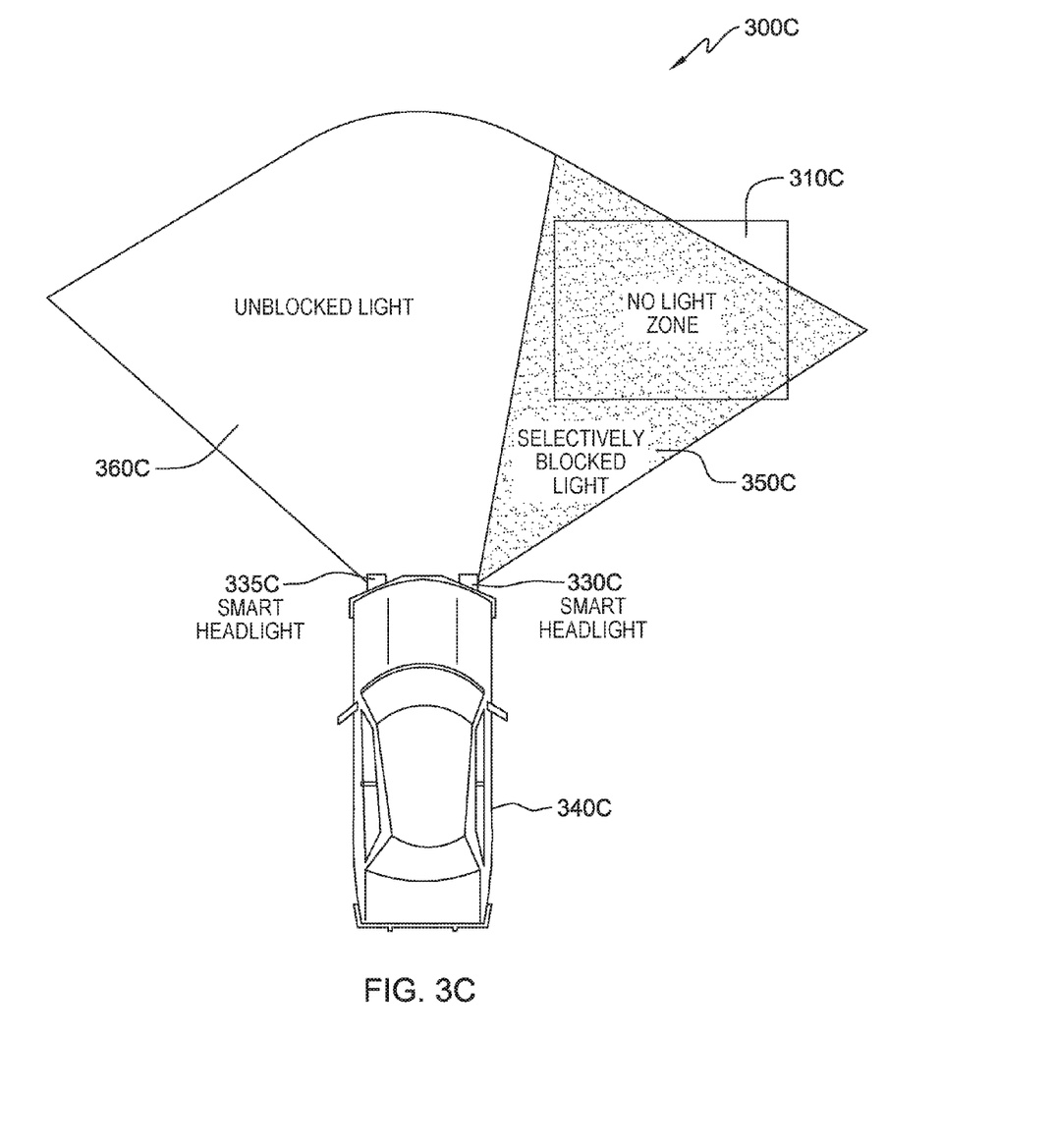
FIG. 3C is an illustration depicting a third example of a light zone in accordance with at least one embodiment of the present invention.

FIG. 3C depicts a third example of a light zone in accordance with at least one embodiment of the present invention. As depicted, FIG. 3C includes no light zone 310C, smart lights 330C and 335C, car 340C, selectively blocked light 350C, and unblocked light 360C. FIG. 3C is an example of a light source that is selectively or partially blocked in response to a light zone such as no light zone 310C.

No light zone 310C may be a no or restricted light zone such as a sea turtle protected zone in Florida where light is restricted from sunset to sunrise from March 1st until October 31st to enable sea turtle hatchings to head to the ocean without being confused by various land light sources. In various embodiments, a communication of information on a light zone such as no light zone 310C includes one or more directions. For example, in no light zone 310C no light may be projected to the east (e.g., toward the ocean) when within no light zone 310C. The desired emitted level of light changes over time in this example. A no or low level of light may be defined for March $1^{st}$ through October $31^{st}$ that changes to an area without a specified light zone (i.e., no restrictions on emitted light) from November $1^{st}$ to the end of February.

For the purposes of discussion in this example, no light zone 310C is a light zone where no or little light can be projected onto no light zone 310C. As discussed previously, in an example of light zone identification method 200, a communication such as a wireless signal from no light zone 310C and/or server 140 (depicted in FIG. 1) provides information to smart lights 330C and 335C such as a location, an extent of the area included in no light zone 310C, and a desired level of emitted light. As depicted in FIG. 3C, smart light 330C in response to receiving information on no light zone 310C may partially shield or block smart light 330C such that the light emitted on the right side of smart light 330C (e.g., toward no light zone 310C) does not project on no light zone 310C. Smart light 330C may use a metal shield or a partial shield, for example that physically blocks light emitted by smart light 330C (as shown by selectively blocked light 350C) from projecting onto no light zone 310C. The unshielded portion of smart light 330C and smart light 335C project unblocked light 360C.

In various embodiments, smart lights 330C and 335C may be an array of individual light elements in a single light source where desired or select individual light elements do not activate in response to a received communication on no light zone 310C. For example, smart light 330C may be an LED headlight that includes an array of individual LED elements. In response to receiving information on a location of no light zone 310C and a current location for smart light 330C, smart light 330C may adjust the number of individual LED elements activated or turn on in an array of LED in smart headlight 330C. Smart light 330C may determine the individual LED elements on the right side of smart light 330C that do not activate and therefore, will not project light into no light zone 310C.

Figure 4:
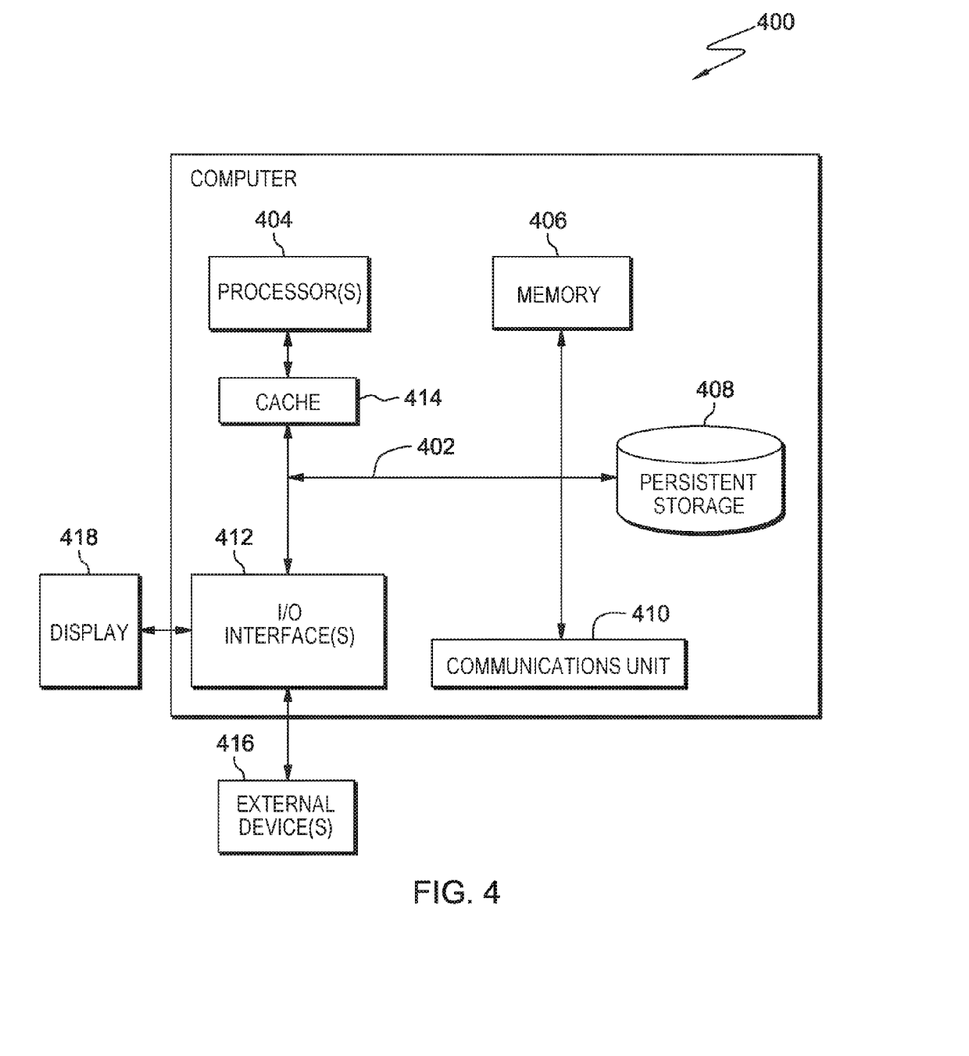
FIG. 4 is a block diagram depicting components of a computer system in accordance with at least one embodiment of the present invention.

FIG. 4 is a block diagram 400 depicting of components of a computer system as in accordance with at least one embodiment of the present invention. In various embodiments, light source 130 may include some or all of the components depicted in FIG. 4. It should be appreciated that FIG. 4 provides only an illustration of one implementation and does not imply any limitations with regard to the environments in which different embodiments can be implemented. Many modifications to the depicted environment can be made.

Server 140 may include processor(s) 404, cache 414, memory 406, persistent storage 408, communications unit 410, input/output (I/O) interface(s) 412, and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is part of persistent storage 408.

Communications unit 410, in these examples, provides for communications with other data processing systems or devices, including resources of light zone 120, light source 130, server 140, and other computing devices not shown in FIG. 1. In these examples, communications unit 410 includes one or more network interface cards. Communications unit 410 may provide communications with either or both physical and wireless communications links. Program instructions and data used to practice embodiments of the present invention may be downloaded to persistent storage 408 through communications unit 410.

I/O interface(s) 412 allows for input and output of data with other devices that may be connected to server 140. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method, executed by one or more processors, the method comprising:
   receiving, by one or more processors, extent information for a light zone wherein a geofence defines an extent for the light zone;
   sending, by one or more processors, to a light source a communication associated with the geofence providing a desired emitted light level for the light zone wherein the light source is a programmable light source;
   determining, by one or more processors, that the light source is proximate to the light zone based, at least in part, on the geofence; and
   determining, by one or more processors, that the light source projects light with the desired emitted light level onto the light zone based, in part, on data received from one or more sensors and controllers in the light source.

2. The method of claim 1, wherein the desired emitted light level has at least one of a light intensity and a power level.

3. The method of claim 1, wherein the extent information for the light zone is relative to at least one of one or more global positioning system co-ordinates, one or more map co-ordinates, one or more manual measurements, one or more indoor positioning system locations, at least one beacon, and at least one wireless hot spot.

4. The method of claim 1, wherein the light source is one of a moving light source and a stationary light source.

5. The method of claim 1, wherein the extent information defines at least two dimensions of the light zone.

6. The method of claim 1, wherein the light zone corresponds to an area associated with an emitted signal from one of a beacon or a wireless hot spot.

7. The method of claim 1, wherein receiving the extent information for the light zone comprises receiving, by one or more processors, at least one of one or more global positioning system coordinates, one or more map coordinates, one or more laser measurements, and one or more indoor positioning system locations associated with the geofence.

8. The method of claim 1, wherein determining that the light source projects light onto the light zone includes using a processor and data received from one or more of a light source receiver, a light source sensor, and a light source controller.

9. The method of claim 1, wherein the desired emitted light level includes at least one of a direction, a color, a duration, and a frequency.

10. The method of claim 1, wherein the desired emitted light level changes over time.

11. The method of claim 1, wherein the light source includes a communication device.

12. The method of claim 1, wherein determining that the light source is proximate to the light zone based, at least in part, on the geofence comprises:
    determining, by one or more processors, that the light source does not project light with the desired emitted light level onto the light zone based, in part, on data received from one or more sensors in the light source and the desired emitted light level; and
    adjusting, by one or more processors, the light source by changing one or more of an emitted light intensity, a light color, a light wavelength, an emitted light direction, a duration of an emitted light, a frequency of activation, and an area of emitted light from the light source.

13. A computer program product comprising:
    one or more computer readable storage media and program instructions stored on the one or more computer readable storage media, the program instructions executable by a processor, the program instructions comprising instructions for:

receiving, by one or more processors, extent information for a light zone wherein a geofence defines an extent for the light zone;

sending, by one or more processors, to a light source a communication associated with the geofence providing a desired emitted light level for the light zone wherein the light source is a programmable light source;

determining, by one or more processors, that the light source is proximate to the light zone based, at least in part, on the geofence; and determining, by one or more processors, that the light source projects light with the desired emitted light level onto the light zone based, in part, on data received from one or more sensors and controllers in the light source.

14. The computer program product of claim 13, wherein the extent information for the light zone is relative to at least one of one or more global positioning system co-ordinates, one or more map co-ordinates, one or more manual measurements, one or more indoor positioning system locations, at least one beacon, and at least one wireless hot spot.

15. The computer program product of claim 13, wherein the light zone corresponds to an area associated with an emitted signal from at least one of a beacon or a wireless hot spot.

16. The computer program product of claim 13, wherein receiving the extent information for the light zone comprises receiving, by one or more processors, at least one of one or more global positioning system (GPS) coordinates, one or more map coordinates, one or more laser measurements, and one or more indoor positioning system locations associated with the geofence.

17. The computer program product of claim 13, wherein the desired emitted light level includes at least one of an intensity, a direction, a color, a duration, and a frequency.

18. A computer system comprising:

one or more computer processors;

one or more computer readable storage media; and program instructions stored on the one or more computer readable storage media for execution by at least one of the one or more processors, the program instructions comprising instructions to perform:

receiving, by one or more processors, extent information for a light zone wherein a geofence defines an extent for the light zone;

sending, by one or more processors, to a light source a communication associated with the geofence providing a desired emitted light level for the light zone wherein the light source is a programmable light source;

determining, by one or more processors, that the light source is proximate to the light zone based, at least in part, on the geofence; and determining, by one or more processors, that the light source projects light with the desired emitted light level onto the light zone based, in part, on data received from one or more sensors and controllers in the light source.

19. The computer system of claim 18, wherein the extent information for the light zone is relative to at least one of one or more global positioning system co-ordinates, one or more map co-ordinates, one or more manual measurements, one or more indoor positioning system locations, at least one beacon, and at least one wireless hot spot.

* * * * *